March 22, 1966     R. ANDREASSEN     3,241,602

HEATING AND COOLING SYSTEM AND CONTROL THEREFOR

Filed June 25, 1963     2 Sheets-Sheet 1

INVENTOR.
Roar Andreassen
BY Emery, Whittemore,
Sandoe & Graham
ATTORNEYS

March 22, 1966 R. ANDREASSEN 3,241,602
HEATING AND COOLING SYSTEM AND CONTROL THEREFOR
Filed June 25, 1963 2 Sheets-Sheet 2
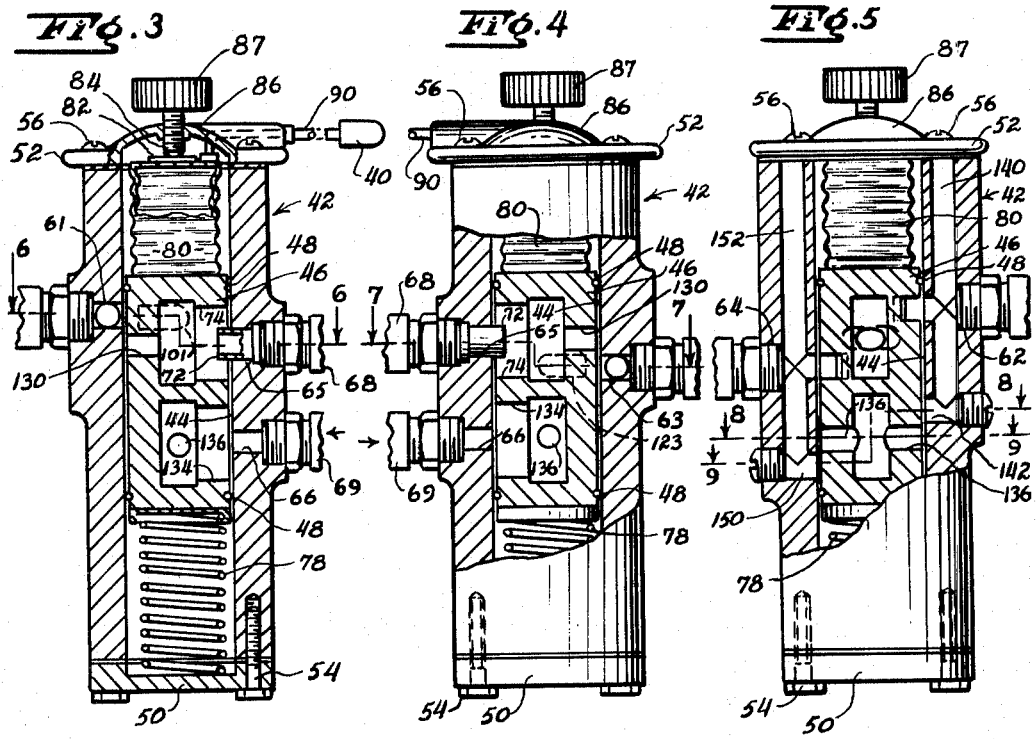
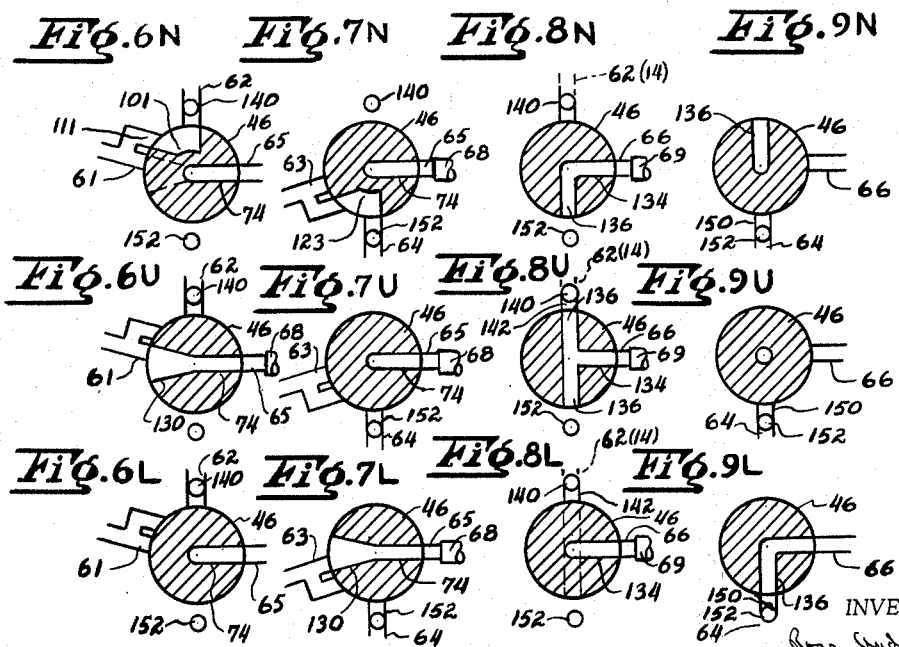
INVENTOR.
Roar Andreassen
BY Emery, Whittemore,
Sandoe & Graham
ATTORNEYS United States Patent Office 3,241,602
Patented Mar. 22, 1966

3,241,602
HEATING AND COOLING SYSTEM AND
CONTROL THEREFOR
Roar Andreassen, 403 Birchtree Lane, Northvale, N.J.
Filed June 25, 1963, Ser. No. 290,427
5 Claims. (Cl. 165—26)

This invention relates to heating and cooling systems such as are used in commercial buildings (office buildings) for heating and cooling the perimeter area; also for use with these types of systems for heating or cooling apartments or houses.

A common or popular system has two mains with branches to each room which serves as a supply and return for hot fluid to a heat exchanger when heating is required and for supply and return of cold fluid to the same heat exchanger when cooling is required.

In a more sophisticated system, used on very few occasions, four mains have been utilized for supply and return of hot and cold fluids simultaneously to one heat exchanger, but on these occasions two three-way valves have been employed, one for the hot fluid and one for the cold fluid.

It is an object of this invention to provide a heating and cooling system in which the same heat exchanger can be used for either heating or cooling, and a special valve means control the supply of hot and cool fluid in such a way as to give the system the same flexibility for different rooms as in the case with systems where heaters in all the rooms are permanently connected with the hot fluid mains, and coolers in all of the rooms are permanently connected with the cold fluid mains.

Still another object is to provide a six-ported dual three-way dual fluid modulating temperature control valve which is simple and rugged in construction. The preferred construction is a slide valve; and features of the construction relate to the operation in response to change in temperature and to adjustment of the automatic actuation to change fluid connections at different temperatures.

Other objects, features and advantages of the invention will appear or be pointed out as the description proceeds.

In the drawing, forming a part hereof, in which like reference characters indicate corresponding parts in all the views.

Figure 2:
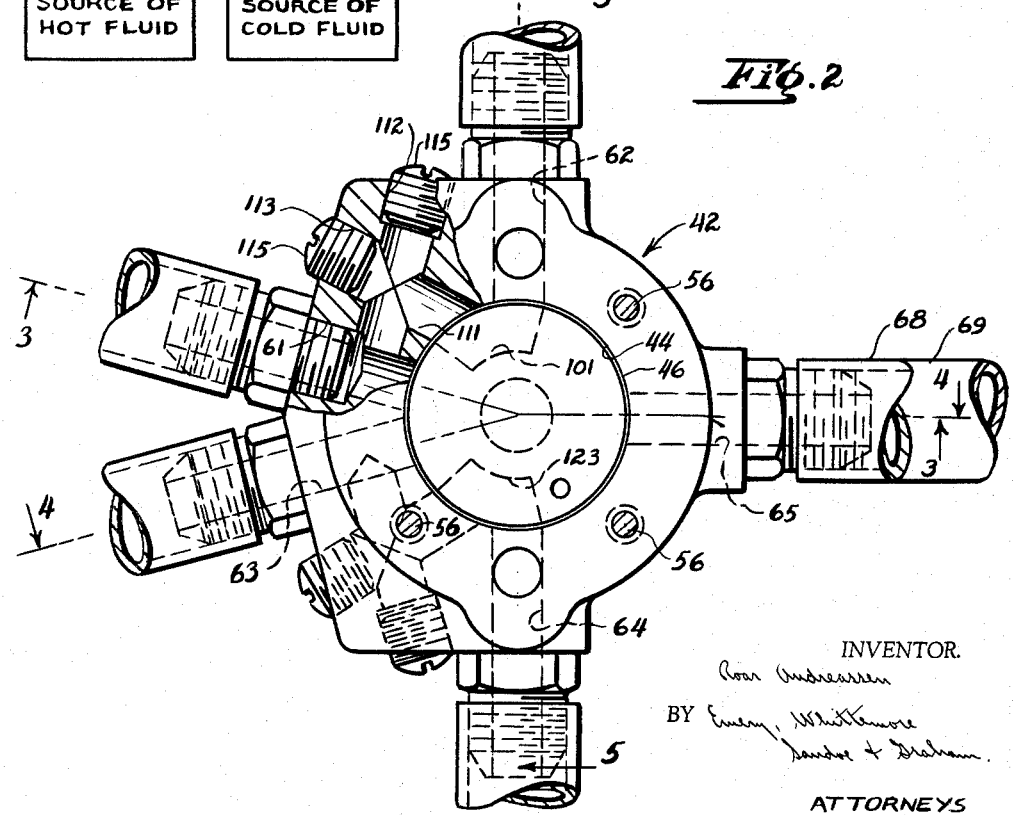
FIGURE 2 is a top plan view, with the end wall removed, of one of the valve means for controlling the supply of fluid to each of the heat exchangers shown in FIGURE 1.

FIGURES 3, 4 and 5 are sectional views taken on the lines 3—3, 4—4 and 5—5, respectively, of FIGURE 2;

FIGURES 6N, 7N, 8N and 9N are diagrammatic, small-scale sectional views on the lines 6—6, 7—7, 8—8 and 9—9, respectively, of FIGURES 3, 4 and 5, with the valve means in neutral position;

FIGURES 6U, 7U, 8U and 9U are diagrammatic sectional views similar to FIGURES 6N, 7N, 8N and 9N, respectively, but showing the connections when the valve element is in its upper position; and FIGURES 6L, 7L, 8L and 9L are diagrammatic sectional views similar to FIGURES 6N, 7N, 8N and 9N, respectively, but showing the connections when the valve element is in its lowered position.

A supply main 11 leads from a source 12 of hot fluid, and a return main 14 connects with the other side of the hot fluid source 12. The hot fluid supply main 11 connects with valve structures 16 on different floors 21, 22 and 23 of a building. Each of the valve structures 16 connects with a heat exchanger 25 on the particular floor on which the valve structure is located.

It will be understood that there may be several heat exchangers on each floor, with the heat exchangers in different rooms, or in different parts of the same room, where the room is large; and each heat exchanger preferably has its own valve structure 16 connected with the hot fluid supply main 11.

Each of the valve structures 16 is also connected with the hot fluid return main 14. The hot fluid is preferably circulated through the system by a pump 28 driven by suitable power means.

There is another supply main 31 connected with a source 32 of cold fluid. This cold fluid supply main 31 is connected with each of the valve structures 16. A return main 34 connects each of the valve structures 16 with the cold fluid source 32; and there is a pump 38 for circulating the cold fluid.

The valve structures 16 include valve means movable into different positions to connect each heat exchanger 25 selectively with the source of hot fluid 12 or the source of cold fluid 32. The movement of the valve means into different positions is preferably automatic and is controlled by a temperature-responsive device 40 located in the space in which the heat is to be controlled. There is, therefore, a temperature-responsive device 40 connected with each of the valve structures 16.

Figure 1:
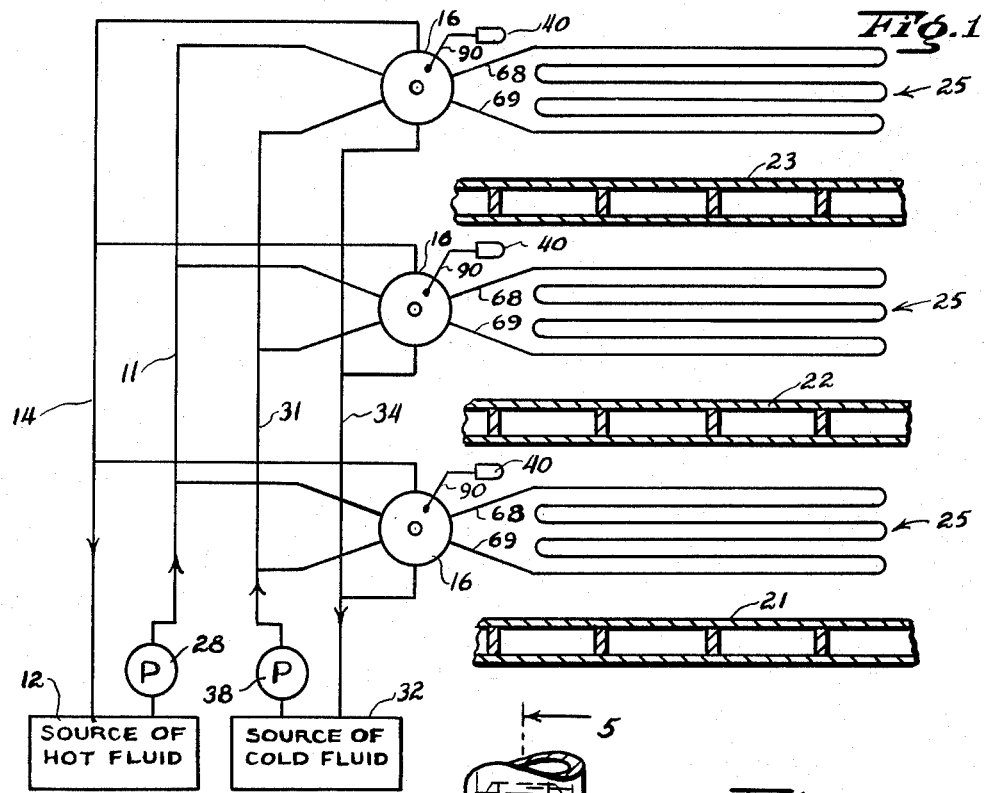
FIGURE 1 is a diagrammatic piping diagram showing a heating and cooling system made in accordance with this invention.

In the diagrammatic showing of FIGURE 1, the valve structures 16 are shown turned on their sides because this locates the different piping connections in more advantageous positions for the diagram. Although the valve structures can be used in this position, they are preferably oriented in the positions shown in FIGURES 3, 4 and 5 when installed in a heating and cooling system.

FIGURE 2 is a top plan view of one of the valve structures 16, with the end wall removed. The valve structure includes a generally cylindrical housing 42 which has a cylindrical inside surface 44 (FIGURE 3) through which ports open for putting the different pipes of the system into communication with one another. The cylindrical surface 44 provides a bearing for valve means or piston 46. This piston 46 is free to move axially into different positions in the cylindrical chamber enclosed by the surface 44. In the preferred construction there are seals, such as O-rings 48, located in circumferential grooves near opposite ends of the valve means 46. Other O-rings can be placed at intermediate locations, if desired.

The cylindrical chamber in the housing 42 is closed at its lower end by an end wall 50 and is closed at its upper end by an end wall 52. At least one of these end walls is removable to provide access to the interior of the housing. Preferably both of the end walls 50 and 52 are removable and they are secured to the housing by screws 54 and 56.

A first port 61 opens through the side wall of the housing 42 and is connected with the hot fluid supply main 11. A second port 62 is connected with the hot fluid return main 14. A third port 63 is connected with the cold fluid supply main 31. A fourth port 64 is connected with the cold fluid return main 34.

On the side of the housing 42 opposite the first and third ports, there are ports for connection to the heat exchanger. These ports are located one above the other and are best shown in FIGURE 3. They include a fifth port 65 and a sixth port 66. Hot or cold fluid is supplied from the port 65 to the heat exchanger, and exhaust fluid from the heat exchanger returns to the interior of the housing 42 through the port 66.

Piping for connecting the ports 65 and 66 with the heat exchanger is indicated by the reference characters 68 and 69, respectively. These connections are clearly shown in FIGURE 1, where the pipes 68 and 69 are offset at angles to one another for clearer illustration. Actually, these pipes 68 and 69 are located one above the other at the housing 42, as is shown in FIGURE 2.

There is a flanged bushing 72 (FIGURE 3) in the port 65. This bushing 72 extends beyond the cylindrical surface 44 and part way into a passage 74 in the piston 46. The passage 74 is of substantially the same width as the outside of the bushing 72 and thus the bushing 72 prevents rotation of the piston 46 about its longitudinal axis. The passage 74 is elongated, however, in the direction of the length of the piston 46 so that the bushing 72 permits limited axial movement of the piston 46 in the cylindrical chamber of the housing 42.

There is a spring 78 compressed between the bottom of the piston 46 and the lower end wall 50. This spring 78 urges the piston 46 upward.

The valve structure has motor means for moving the piston 46 downward against the pressure of the spring 78. This motor means consists of a bellows 80 located between the upper end of the piston 46 and the upper end wall 52. In order to adjust the bellows 80, there is a plate 82 secured to the end wall of the bellows 80 in position to contact with a screw 84 threaded through a raised center portion 86 of the end wall 52. This screw 84 has a knob 87 for convenient rotation of the screw by hand.

The pressure in the bellows 80, and the resulting force which the bellows exerts against the piston 46, is controlled by the temperature-responsive device 40 which communicates with the interior of the bellows 80 through tubing 90.

Although the bellows 80, its adjusting screw 84 and the temperature-responsive device 40 are shown diagrammatically in the drawing, they are merely representative of temperature-responsive means for applying pressure to the upper end of the piston 46 at definite temperatures at which it is desirable to have the valve means change its position to connect or disconnect the heat exchanger with the source of hot or cold fluid. Such temperature-responsive devices are well known and various constructions can be used in the combination of this invention.

When the valve means or piston 46 is in the position shown in FIGURES 3, 4 and 5 it is in its neutral position and the heat exchanger is shut off from both the source of hot fluid and the source of cold fluid. Passages in the piston 46 and in the housing 42 put the hot fluid supply main 11 in direct communication with the return main 14, and put the cold fluid supply main 31 in direct communication with the cold fluid return main 34. This result is obtained by a circumferential groove passage 101 (FIGURES 2 and 6N) of short angular extent, in the piston 46. This groove passage 101 spans the distance between the port 62 and an auxiliary port 111, which is a branch of the first port 61 formed by special drillings 112 and 113 in the wall of the housing 42; the ends of these drillings 112 and 113 being closed by plugs 115.

The communication between the ports 61 and 62 is evident from FIGURE 6N.

A similar groove passage 123 puts a branch of the port 63 in direct communication with the port 64, there being drillings in the wall of the housing to establish the communication, as in the case of the ports 61 and 62. This is clearly shown in FIGURE 7N. At the level of the port 65 there is no communication with any other port when the piston 46 is in its neutral position, as shown in FIGURE 3, because a passage 130, which opens into the passage 74, is against a solid area of the inside wall of the housing.

At the level of the port 66, there is an elongated passage 134 which communicates with cross passages 136 but neither of the cross passages 136 is in position to communicate with any opening in the cylindrical surface 44 when the piston is in neutral position, as will be evident from FIGURE 5 and FIGURE 9N.

When the space, which has its temperature controlled, becomes too cold, the pressure of the bellows 80 decreases and permits the spring 78 to lift the piston 46 into position to bring the passage 130 (FIGURE 3) into alignment with the port 61. This establishes communication between the hot fluid supply main 11 and the supply pipe 68 leading to the heat exchanger, as is evident from FIGURE 6U. It also establishes communication between the exhaust pipe 69 from the heat exchanger and the hot fluid return main 14, as is evident from FIGURE 8U. This communication is established through a longitudinal passage 140 (FIGURE 5) in the wall of the housing 42. The lower end of the passage 140 opens into the interior of the housing through a cross passage 142 which is in alignment with the cross passage 136 of the piston 46 when the piston 46 is moved upward by the spring 78.

The condition at the levels 7—7 and 9—9, when the piston 46 is in its raised position, is shown in FIGURES 7N and 9N, respectively.

When the temperature in the space to be controlled rises to a predetermined value, the bellows 80 expands to push the piston 46 downward so that the piston returns to its neutral position and shuts off the heat exchanger from the hot fluid mains. If the temperature continues to rise because of high outdoor temperature, or from other causes, the bellows 80 expands further and pushes the piston 46 downward until the passage 130 in the piston comes into alignment with the port 63. Fluid from the cold fluid supply main 31 is then free to flow through the passage 130 to the port 65 and pipe 68 leading to the heat exchanger. Downward movement of the piston 46 brings the cross passage 136 (FIGURE 5) into alignment with a cross passage 150, communicating with a longitudinal passage 152 in the side wall of the housing; and this longitudinal passage 152 puts the cross passage 136 in communication with the port 64 and the cold fluid return main 34. Thus cold fluid from the heat exchanger flows through the pipe 69 (FIGURE 3), port 66, passage 134, cross passage 136, cross passage 150 (FIGURE 5), longitudinal passage 152, and port 64 to the cold fluid return main 34.

The conditions at the various levels 6—6, 7—7, 8—8 and 9—9, when the piston is in its lower position, are shown in FIGURES 6L, 7L, 8L and 9L, respectively.

The preferred embodiment of the invention has been illustrated and described, but changes and modifications can be made and some features can be used in different combinations without departing from the invention as defined in the claims.

What is claimed is:

1. A heating and cooling system comprising four fluid mains, including a supply and return main for heating fluid, and a supply and return main for cooling fluid, a plurality of heat exchangers at different locations in the system for controlling the temperatures of different spaces, and separate valve means connecting each of the heat exchangers with the fluid mains, each of the valve means having six ports connected, respectively, with the four mains and with opposite ends of the heat exchanger, the valve means being movable into a first position to connect the opposite ends of the heat exchanger with the supply and return mains for the heating fluid, and being movable into a second position to connect opposite ends of the heat exchanger with the supply and return mains for the cooling fluid, the valve means being movable into a third position intermediate its first and second positions and in which it blocks flow of both heating and cooling fluid to the heat exchanger, the valve means having a passage that connects the port that is in communication with the heating fluid supply main directly to the port that is in communication with the heating fluid return main when the valve means is in its third position, and the valve means also having a passage that connects the port which is in communication with the cooling fluid supply main directly to the port which is in communication with the cooling fluid return main when the valve means is in its third position.

2. The heating and cooling system described in claim 1 characterized by the valve means having a passage that connects the port that is in communication with heating fluid supply means directly to the port that is in communication with the heating fluid return main when the valve means is in its second position as well as when the valve means is in its third position.

3. The heating and cooling system described in claim 2 characterized by the valve means having a passage that connects the port which is in communication with the cooling fluid supply means directly to the port which is in communication with the cooling fluid return main when the valve means is in its first position as well as when the valve means is in its third position.

4. The heating and cooling system described in claim 1 characterized by the valve means including a movable valve element that is a piston movable axially in a housing into the different positions of said valve means, and a thermally responsive actuator at one end of the piston for moving the piston in response to temperature changes.

5. The heating and cooling system described in claim 4 characterized by a spring in the valve in position to move the piston in the opposite direction to that in which it is moved by the temperature responsive actuator.

References Cited by the Examiner

UNITED STATES PATENTS

| | | | |
|---|---|---|---|
| 2,557,035 | 6/1951 | Lichty | 165—26 |
| 3,162,242 | 12/1964 | Profos | 165—32 |

FOREIGN PATENTS 594,280  4/1934  Germany.

JAMES W. WESTHAVER, *Primary Examiner.*